United States Patent [19]

Richmond et al.

[11] 4,018,314

[45] Apr. 19, 1977

[54] ANTI-THEFT VEHICLE BRAKE-SUPERVISING DEVICE

[76] Inventors: Raymond Richmond, 249-20 Thornhill Ave., Little Neck, N.Y. 11362; Edward Parmer, 118 N. Waldinger St., Valley Stream, N.Y. 11580; Edward G. Parmer, Jr., 167 Caroline Ave., Garden City, N.Y. 11530

[22] Filed: June 30, 1976

[21] Appl. No.: 701,094

[52] U.S. Cl. .............................. 188/353; 60/569; 137/493.6; 137/493.9; 137/598; 192/3 H; 303/89

[51] Int. Cl.² ........................................ B60R 25/08

[58] Field of Search ............ 188/353; 303/79, 89; 60/568, 569; 192/3 H; 137/493.3, 493.6, 493.9, 495, 508, 598

[56] References Cited

UNITED STATES PATENTS

| | | | |
|---|---|---|---|
| 2,285,781 | 6/1942 | Patrick | 188/353 |
| 3,625,573 | 12/1971 | Conn | 303/89 |
| 3,682,195 | 8/1972 | Cuetkovich | 303/89 X |
| 3,774,978 | 11/1973 | Steunton et al. | 303/89 |

FOREIGN PATENTS OR APPLICATIONS

| | | | |
|---|---|---|---|
| 694,541 | 7/1953 | United Kingdom | 188/353 |
| 969,901 | 9/1964 | United Kingdom | 137/508 |

*Primary Examiner*—George E. A. Halvosa
*Attorney, Agent, or Firm*—Bauer, Amer & King

[57] ABSTRACT

A vehicle anti-theft device which maintains the braking function of the braking fluid by preventing reverse flow thereof through a closed main valve opening from the wheel cylinder back to the master cylinder until, following an authorized procedure, the main valve opening is cleared. As an improvement over the prior art, the main valve opening is closed manually by a member being seated therein, and this member is then held in place under pressure, the member, however, having an internal pressure-releasing valve for releasing the "holding pressure" when it is necessary to move the member into a clearance position off of the valve opening.

6 Claims, 8 Drawing Figures

U.S. Patent  April 19, 1977  Sheet 1 of 2  4,018,314
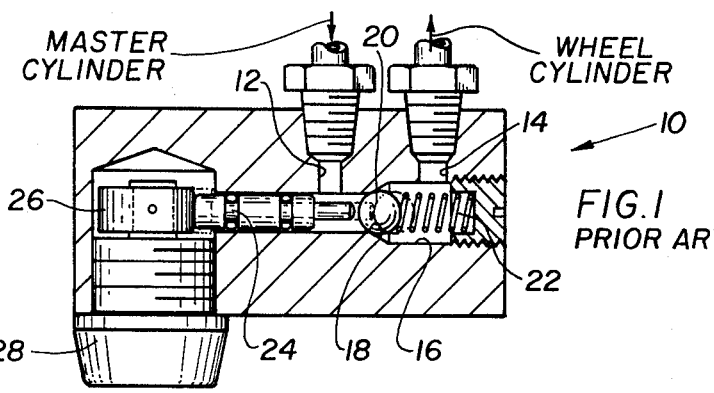
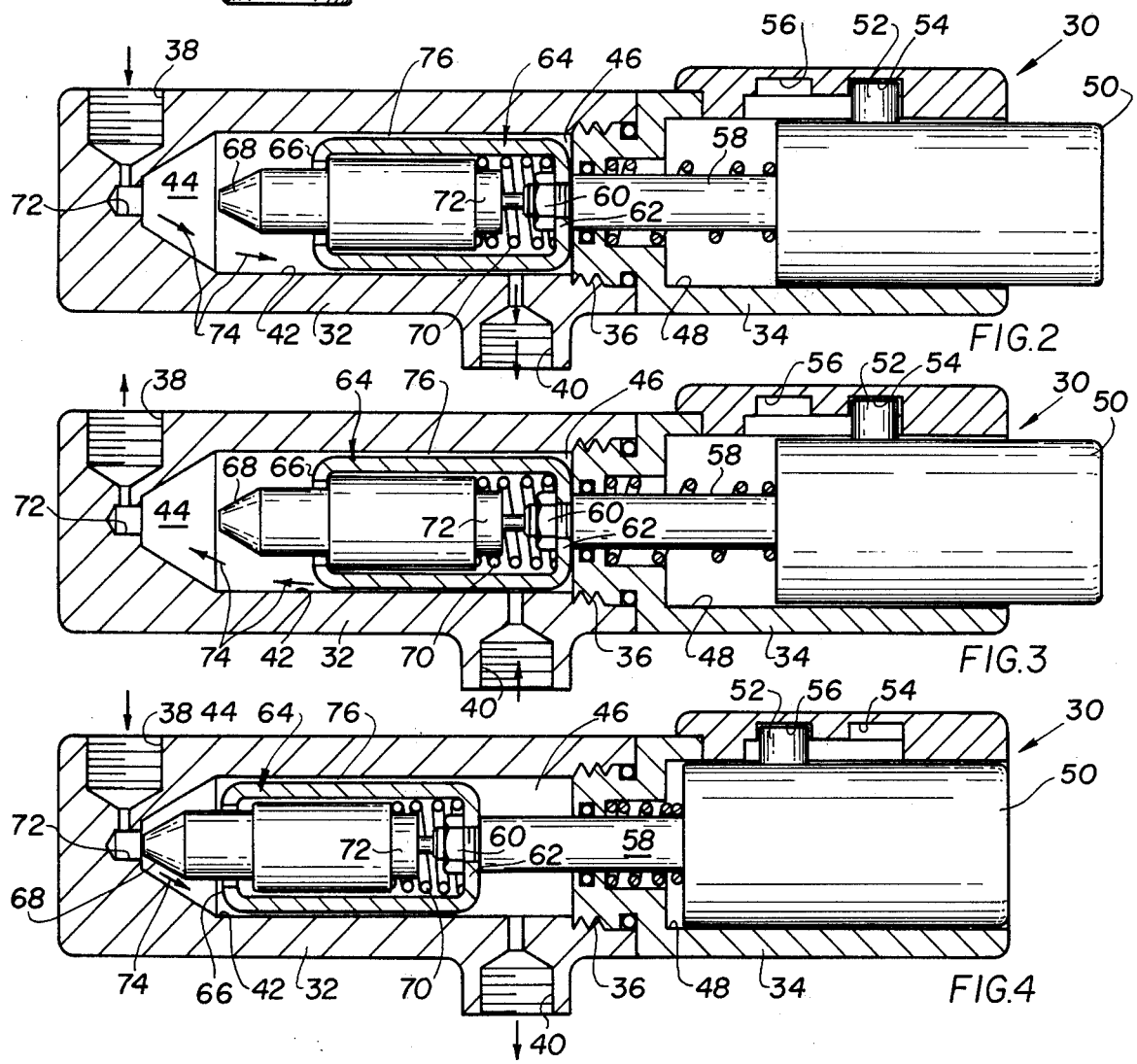

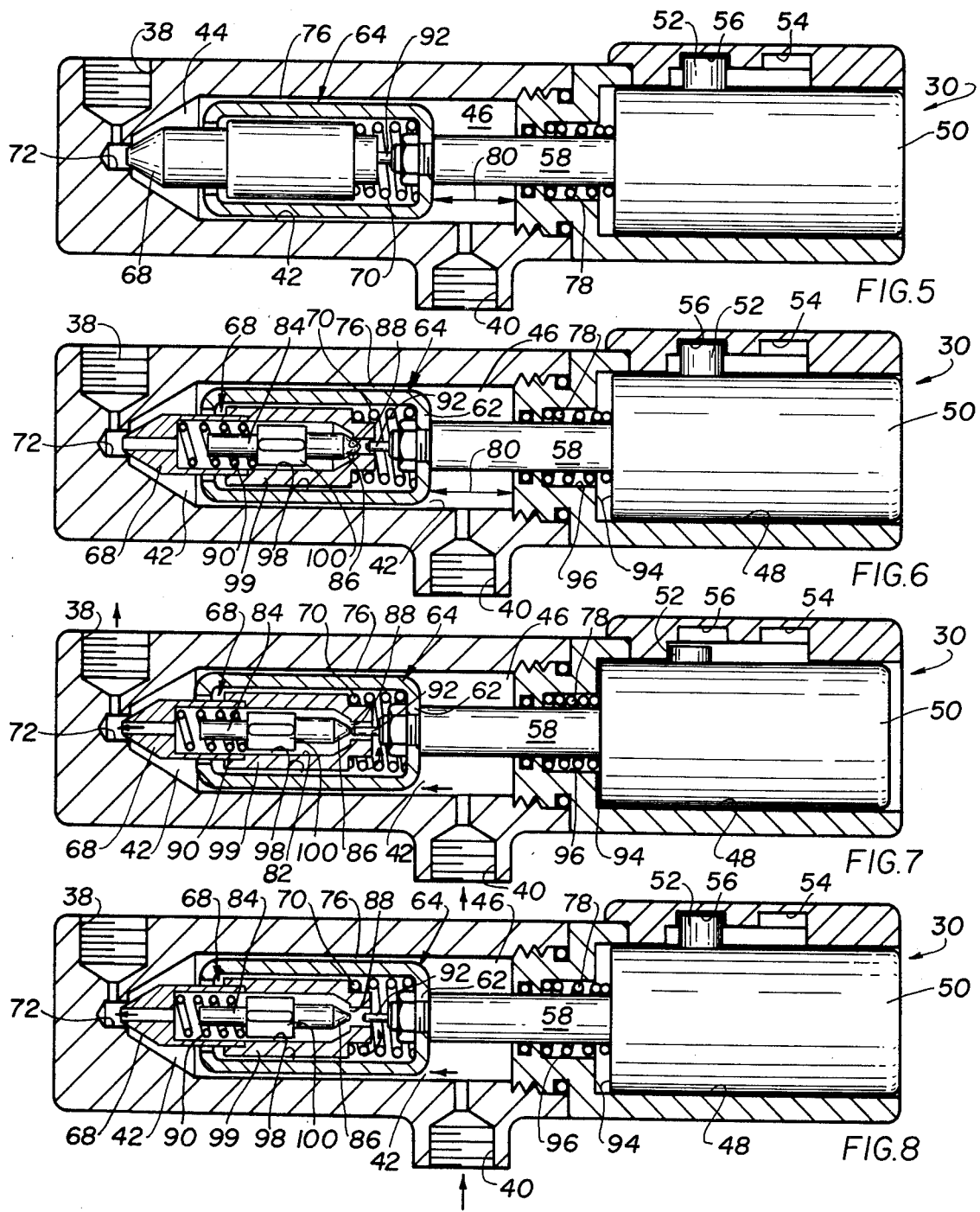

ANTI-THEFT VEHICLE BRAKE-SUPERVISING DEVICE

The present invention relates generally to a vehicle anti-theft device, and more particularly to an improved device of the type that advantageously uses the vehicle braking fluid to prevent its movement, unless by an authorized user.

Braking fluid-supervising devices for anti-theft purposes are already well known, as exemplified by the devices of U.S. Pat. Nos. 3,559,755, 3,515,442, 3,617,100, 3,617,663 and 3,653,730. In principle, the flow passage between the vehicle master and wheel cylinders is blocked by a one-way valve, and thus upon application of the brake, the brake fluid flows in the permitted direction through the valve into the wheel cylinder to immobilize the vehicle, but cannot reverse its flow unless a security device, such as a lock or the like, is operated to unblock the one-way valve. Known devices utilizing this principle are not entirely satisfactory because of one or more shortcomings. If the one-way valve is closed electrically, a malfunction could produce a seal that prevents even directional flow into the wheel cylinder, thus leaving the vehicle, conceivable while it is in motion, without brakes. This dictates manually establishing the one-way valve function, except that the pressure build-up downstream of the valve, which must be sufficient to immoblize the vehicle, also renders it difficult to manually urge the various components through their required movements as when the valve must be opened, and thus manual operation has not been a totally satisfactory alternative to electrical operation.

Broadly, it is an object of the present invention to provide an improved braking fluid-type anti-theft device overcoming the foregoing and other shortcomings of the prior art. Specifically, it is an object to provide an effective manually-operating valve closing and opening device for a vehicle braking fluid system, so that selective use can be made of the vehicle braking function for security purposes.

An anti-theft vehicle brake-supervising device demonstrating objects and advantages of the present invention includes, in a strategic location between the fluid connections to the master and wheel cylinders, a flow chamber having opposite distal and proximal ends and a main valve opening adjacent its distal end, i.e., at the end remote from the vehicle dashboard. A valve support member is operatively arranged to be manually urged through movement in said flow chamber between opposing operative positions respectively adjacent said distal and said proximal ends of said flow chamber, said valve support member being of a prescribed smaller diameter than the flow chamber so as to define an encircling annular fluid passage for allowing fluid flow through the flow chamber and thus between the master and wheel cylinders. A first valve and a cooperating biasing spring are operatively disposed in the valve support member so that movement of this member from said flow chamber proximal end to said flow chamber distal end correspondingly urges the first valve through closing movement upon the main valve and only allows directional flow of hydraulic fluid from said master cylinder fluid connection to said wheel cylinder fluid connection to the extent of opening movement permitted in said first valve relative to said valve opening by said biasing spring. Within the first valve there is also an internal flow passage having a pressure release valve opening and a second valve is disposed to normally close this pressure release valve opening. Finally, there is provided a valve-unseating means on the valve support member which is effective to unseat the second valve incident to further movement of this member towards said flow chamber distal end, so as to release pressure fluid from said flow chamber proximal end through said second valve and into said master cylinder through said first fluid connection thereof. As a consequence of the aforesaid release of pressure fluid, the manual urging of said valve support member through movement back to said flow chamber proximal end is facilitated, and thus opening of the main valve for normal use of said hydraulic fluid for braking service for said vehicle is readily achieved.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a front elevational view in longitudinal section illustrating a typical prior art construction which uses the hydraulic braking fluid of the vehicle for an anti-theft function;

The remaining FIGS. 2–8, respectively, illustrate the improved anti-theft device according to the present invention in its various modes of operation. Each of these views is a front elevation of the device in longitudinal section, in connection with which a more detailed description follows. It suffices at this point in the description to note that in said figures the cooperating positions of the various components are illustrated when the device is not operative and the brakes are applied, as in FIG. 2; when the brakes are released, as in FIG. 3; when the device is functioning and the brakes are applied as in FIGS. 4 and 5; and when the brakes are then released, as in FIG. 6; when the device is changed from its operating mode to its non-operating mode, as in FIG. 7; and finally when excess pressure is released during the operating mode of the device, as in FIG. 8.

Reference is first made to FIG. 1 which illustrates a typical prior art construction of an anti-theft device, generally designated 10, which attempts to advantageously use the hydraulic braking fluid of the vehicle to prevent unauthorized use of the vehicle. To this end, device 10 typically includes a fluid connection 12 from the master brake cylinder and a fluid connection 14 to at least one wheel cylinder. The flow passage 16 communicates with the connections 12, 14 and has a valve opening 18 with a cooperating ball valve 20 normally biased into a closed position by the biasing spring 22. Push rod 24 is actuated through movement by a rotary cam 26 to selectively unseat the ball 20 from the valve opening 18. The anti-theft device 10 as just described is exemplified by the device of U.S. Pat. No. 3,515,442, to which reference should be made for a more detailed description. The description provided above suffices for present purposes.

Typical operation of the prior art device 10 is one which contemplates actuating or applying the vehicle brakes which results in flow of the hydraulic fluid under pressure through the fluid connection 12 to the downstream side of the valve opening 18. The pressure of the hydraulic fluid will be understood to be sufficient to unseat the ball 20 from the valve opening 18 against the urgency of the biasing spring 22. Thus the hydraulic fluid flows through the passage 16 and through the fluid connection 14 into at least one wheel cylinder in which it performs, in a well understood manner, a braking function and prevents movement of the vehicle. Valve 18, 20 will of course be recognized as a one-way valve in that the hydraulic pressure downstream of the valve opening 18 together with the biasing spring 22 is effective in urging the ball valve 20 to close upon the valve opening 18 and thereby prevent fluid flow from the wheel cylinder back to the master cylinder. Thus, under the circumstances just described, the vehicle cannot theoretically be moved until ball 20 is unseated from valve opening 18 allowing the reverse flow of hydraulic fluid from the wheel cylinder through the fluid connection 14, flow passage 16, and back through the fluid connection 12 to the master cylinder. Thus, a lock or similar security device 28, which can be operated only by an authorized person, is provided and is effective in permitting operation or movement of the cam 26 from its full line position to its phantom line position, as illustrated in FIG. 1, in which the cam 26 urges the push rod 24 through movement which results in unseating of the ball 20, and thus theoretically causes the release of the hydraulic fluid from the wheel cylinder. In actual practice, however, the device 10 is difficult to operate in the manner just described. Among other reasons, the hydraulic fluid requires a pressure on the order of 750 pounds per square inch in order to prevent movement of the vehicle, and thus this same pressure is operating downstream against the ball 20 to prevent it from being unseated from the valve opening 18. As a practical matter, therefore, it is difficult to manipulate the cam 26 to cause unseating of the ball valve 20 and, in other respects as well, it is difficult to achieve proper functioning of the prior art anti-theft device 10.

Reference is now made to the within improved anti-theft device, generally designated 30, which overcomes the foregoing and other shortcomings of the prior art. Since device 30 will be described in its various positions of movement as depicted in FIGS. 2-8, respectively, the structural features that are related to the specific function that is illustrated will be described in connection with the specific figure, rather than initially describing all of the structural features of the device 30 and then describing the functioning thereof.

Referring first to FIG. 2, device 30 includes cylindrical casings 32 and 34 which are threadably interconnected, as at 36, or can be separately mounted with a cable connecting the two casings for remote control. This permits the key lock to be mounted on the dashboard or other convenient location. Casing 32 is appropriately machined to include a fluid connection 38 which will be understood to be in communication with the vehicle master cylinder. At the opposite end of the casing 32 is a similarly machined fluid connection 40, but in communication with at least one of the wheel cylinders of the vehicle. Providing communication between the connection 38 and 40 is a flow chamber 42, the distal end 44 of which is adjacent the master cylinder connection 38, and the opposite or proximal end 46 of which is adjacent the fluid connection 40 to the wheel cylinder. The characterization of end 44 as being distal and end 46 as being proximal is in relation to the casing 34 which will be understood to be mounted in the dashboard of the vehicle and thus nearest to the user of the vehicle. That is, since the user will be situated behind the dashboard and thus near the casing 34, from his viewpoint the end 44 of the flow chamber 42 is distal, whereas the end 46 is proximal.

Formed within the casing 34 is a compartment 48 for sliding movement of a lock member 50. Associated in any appropriate manner with lock 50 is a locking projection 52 which has a locking position projected within one of two recesses 54 and 56, the significance of which will soon be apparent.

Lock 50 has a push rod 58 affixed to it which, at its opposite end, is connected, as by a nut 60 or the like, to the closed end 62 of a cylindrically shaped valve-support member, generally designated 64. The opposite end of member 64 is open, as at 66, and there is projected through the opening 66 a main valve 68. The normal projecting position of valve 68 through the opening 66 is achieved as a result of the urgency of a biasing spring 70 strategically located about a reduced diameter base 72 in the closed end 62 of member 64.

In the position of the components just described and as depicted in FIG. 2 it will be understood that the device 30 is in its "off" position or non-operating mode. At this time projection 52 is locked in recess 54 and member 64 is thus in the proximal end 46 of the flow chamber 42. Assuming that the brakes are applied at this time, the hydraulic fluid flows through the fluid connection 38 and through a main valve opening 72, which as clearly illustrated in FIG. 2 is located adjacent the distal end 44 of the flow chamber 42, and thus into the flow chamber 42. As illustrated by the reference arrows 74, the hydraulic fluid will continue its flow through an annular flow passage 76 which exists about the cylindrical support member 64. To this end, it will be understood that the diameter of member 64 is of a selected extent less than the diameter of the flow passage 42, and thereby provides an annular clearance for said flow passage 76 about the member 64. As a result, the hydraulic fluid 74 flows through the fluid connection 40 to the wheel cylinder, and is thus effective in providing braking service for the vehicle.

Reference should now be made to FIG. 3 in which similar parts already described are identified by the same reference numeral. Actually, FIG. 3 is identical to FIG. 2 in that it illustrates the device 30 in its off or non-operating mode which is also the condition illustrated in FIG. 2. FIG. 3 merely indicates that when the brakes are released, that the hydraulic fluid 74 will reverse in its direction of flow and thus travel from the wheel cylinder through the fluid connection 40, through the passage 76 about the cylindrical member 64, through the interconnecting flow passage 42, through the main valve 72, and finally through the fluid connection 38 back into the master cylinder.

Let it now be assumed that the device 30 is placed into its operating mode, as illustrated in FIG. 4. This is done by using a key for the lock 50 which, it will be understood, enables retraction of the projection 52 out of the recess 54 and thus permits the vehicle operator to push in on the lock 50 and thus moves the entire internal mechanism along the compartment 48 to its operative position providing its operating mode. Said operating position is one in which the lock 50 is moved against the return spring 78 and in which, more important, projection 52 engages the inner recess 56. The operator is then required to release projection 52 into locking engagement within the recess 56 thereby establishing the device 30 in its "on" position. As a result of this sliding movement of the lock 50, and thus of the push rod 58 connected thereto, there is corresponding sliding movement of valve-support member 64 from its position in the proximal end 46 of the flow chamber 42 into the operative position adjacent the distal end 44 of this chamber. As a consequence, this projects the conical valve 68 initially into sealing relation over the main valve opening 72. Although this is not actually depicted in FIG. 4, it should be readily understood that this condition will result. In this connection, the biasing spring 70 as illustrated in FIG. 4 will make necessary allowance in the distance through which member 64 is urged through movement and the point during said movement at which valve 68 makes sealing contact with the walls bounding the main valve opening 72. In this connection also, the spring 70 also makes allowances for any misalignment between the valve 68 and the valve opening 72.

Still referring to FIG. 4, with the device 30 in its operating mode, let it now be assumed that the vehicle brakes are applied resulting in the forcing of the hydraulic fluid from the master cylinder through the fluid connection 38 up to the obstruction presented by the closed position of valve 68 in the main valve opening 72. Under these circumstances and as actually illustrated in FIG. 4, it will be understood that the pressure of the hydraulic fluid is such as to force the valve 68 off of the valve opening 72, thereby resulting in fluid flow 74 into the flow passage 42. This hydraulic fluid continues flowing through the previously noted anular flow passage 76, eventually reaching the fluid connection 40 to the wheel cylinder. The hydraulic fluid thus enters one or more of the wheel cylinders and is effective in achieving a braking function therein.

Reference should now be made to FIG. 5 which illustrates the location of the various components of the device 30 in its operating mode and which further assumes that the vehicle brakes are released. Under these assumed conditions it will be noted that the hydraulic fluid can reverse flow through the fluid connection 40 and enter into the proximal end 46 of the flow chamber 42. This hydraulic fluid can also flow through the annular flow passage 76 and enter into the distal end 44 of the flow passage. At this point, however, it meets an obstruction against further flow by virtue of the main valve 68 being in closed or sealed contact over the main valve opening 72. As a consequence, the vehicle cannot be moved unless valve 68 is unseated from valve opening 72 and the hydraulic fluid is then permitted to reverse its flow fully through the fluid connection 38 and back into the master cylinder. This, however, cannot be achieved without a key to the lock 50 which, theoretically, is the authorized way in which the projection 52 can be removed from recess 56 enabling sliding movement of the lock 50 back to its "off" position of FIG. 2, a position which also correspondingly will withdraw valve 68 from its closed relation over the main valve opening 72. Before indicating how this is achieved, it should be noted that the high pressure hydraulic fluid which flows from the wheel cylinder through the fluid connection 40 is situated behind the closed end 62 of the valve support member 64, and thus in the location illustrated by the double-headed arrow 80. Thus the hydraulic fluid pressure 80 obviously interferes with withdrawing movement of the member 64, i.e., movement of member 64 from the distal end 44 to the proximal end 46 of the flow chamber 42.

To alleviate the interfering effect of pressure head 80 it is therefore provided in accordance with the present invention to embody the device 30 with a pressure release function. To this end, and as clearly illustrated in FIG. 6, valve 68 is provided with an internal flow passage 82. The medial portion of passage 82 is of an enlarged diameter and accomodates an internal second valve member 84 which includes a conical valve head 86 which is normally urged in a closed position in relation to valve opening 88 by the urgency of spring 90. Disposed in cooperating and facing relation to the conical valve member 86 is an axial projection 92 which, in the illustrated embodiment, is an integral part of the forward end of the push rod 58.

To return device 30 from its operating to its non-operating mode, the procedure contemplates inserting the key in the lock 50 and thus withdrawing the projection 52 from the recess 56. This frees the lock 50 for sliding movement along the sliding compartment 48 but, as already explained, in view of the pressure head 80 the only direction in which lock 50 can be moved is from right to left, rather than from left to right against the pressure head. Lock 50 is thus moved in this direction to the extent permitted by the clearance 94 which exists between the lock 50 and the reduced diameter bore 96 serving as a seat for the return spring 78. This degree of movement is sufficient to move the projection 92 against valve member 86, thereby unseating this valve from the opening 88. The unseating of valve 86 in turn results in the hydraulic fluid flowing through an internal annular passage 98 which exists between the outside diameter of the valve member 100 and the inner diameter of the member 99, thereby enabling the hydraulic fluid to enter the right-hand end of the flow passage 82 and flow past the valve member 86. Once past the valve member 86, the hydraulic fluid flows internally through the remainder of the valve 68, and thus through the valve opening 72 into the fluid connection 38 back into the master cylinder. The significant consequence of the release of the pressure head 80 is that it permits the lock 50 to then be withdrawn from left to right which, of course, results in unseating of the control valve 68 from the main valve opening 72. This, in turn, clears the flow passage between the fluid connections 40 and 38 and thus causes emptying of the wheel cylinder, thereby releasing the vehicle for movement.

In summary, lock 50 is initially urged through movement from right to left which releases the pressure head 80 and is then moved from its FIG. 5 "on" position back to its FIG. 2 "off" position, or from left to right.

Reference should now be made to FIG. 8 which illustrates that the valve 86 can be unseated without using the projection 92. More particularly, the circumstances contemplated by FIG. 8 is one in which the device 30 is in its operating mode and there is significant thermal expansion in the hydraulic fluid due to excessive heat or other such causes. In the absence of some release of this enlarging body of hydraulic fluid from the wheel cylinders there will either be a rupture in the cylinder or in some conduit connection in the hydraulic system. The improved device 30 of the present invention therefore contemplates reverse flow of the hydraulic fluid through the fluid connection 40 and up to the obstruction presented by the seating of the valve 86 in the valve opening 88. When the pressure build-up reaches a prescribed extent, however, it will be effective in forcing the valve 86 from the opening 88, thereby allowing a "bleed-off" flow of hydraulic fluid back to the master cylinder. In this connection, said second valve 84 is appropriately constructed so that member 100 thereof, which functions as a seat for the spring 90, is axially adjustable, to thereby correspondingly place spring 90 into any degree of compression to, in turn, affect the urgency with which the spring forces valve 86 into its closed position in relation to the valve opening 88. The function of valve 84 as just described is in accordance with the functioning of a conventional pressure regulating valve.

It is to be understood that the device need not be mounted on the dashboard but can be located in any convenient location.

The device is "fail-safe" oriented. That is to say, cutting of the control cable does not deactivate the apparatus. In still another sense it is "fail-safe" in operation. If one were to lock the device while the vehicle is in motion, there is no sudden stopping action, rather, as the driver depresses the brake pedal, normal braking occurs until the brake is locked by the locking device.

The term "hydraulic fluid" is used only for purposes of illustration. The device may also be used to lock pneumatic braking systems.

From the foregoing, it should be readily appreciated that there has been described herein a noteworthy vehicle brake-supervising device which minimizes theft which is not vulnerable to the prior art shortcomings. Specifically, device 30 is manually shifted or actuated into its operative position initially closing the flow passage of the hydraulic fluid, as distinguished from being shifted by solenoid or the like, so that there is no possibility of so tightly sealing the flow passage against flow, as might occur with a solenoid malfunction, that the brakes cannot be operated when the vehicle is in motion. Naturally, a loss of the braking function during motion is an intolerably dangerous condition. Although manually operated, device 30 is readily shiftable between operative positions without interference by pressure build-ups or the like.

A latitude of modification, change and substitution is intended in the foregoing disclosure and in some instances some feature of the invention will be employed without a corresponding use of other features. Accordingly, it is appropriate that the appended claims be construed broadly and in a manner consistent with the spirit and scope of the invention herein.

What is claimed is:

1. In an anti-theft vehicle brake-supervising device of the type which selectively prevents reverse flow of fluid from at least one vehicle wheel cylinder back to the vehicle master cylinder to thereby maintain the braking function of said fluid within said wheel cylinder, the improvement comprising means defining a flow chamber having opposite distal and proximal ends, a first and a second fluid connection respectively connected from said flow chamber distal end to said vehicle master cylinder and from said flow chamber proximal end to said wheel cylinder to normally allow opposite direction fluid flow between said master cylinder and wheel cylinder through said flow chamber, means defining a main valve opening including a seat in said flow chamber distal end for selectively interrupted to prevent flow between said first and second fluid connections incident to the closing of said valve opening, a valve support member operatively arranged to be manually urged through movement in said flow chamber between opposing operative positions respectively adjacent said distal and said proximal ends of said flow chamber, said valve support member being of a prescribed smaller diameter than said flow chamber so as to define an encircling annular fluid passage for allowing fluid flow through said flow chamber, a first valve and a cooperating biasing spring operatively disposed in said valve support member so that movement of said member from said flow chamber proximal end to said flow chamber distal end correspondingly urges said first valve through closing movement upon said valve seat and only allows directional flow of fluid from said master cylinder fluid connection to said wheel cylinder fluid connection to the extent of opening movement permitted in said first valve relative to said valve opening by said biasing spring, means in said first valve defining an internal flow passage having a pressure release valve opening, a second valve normally closing said pressure release valve opening, and valve-unseating means on said valve support member effective to unseat said second valve incident to further movement of said member towards said flow chamber distal end so as to release pressure fluid from said flow chamber proximal end through said second valve and into said master cylinder through said first fluid connection thereof, whereby the aforesaid release of pressure fluid facilitates the manual urging of said valve support member through movement back to said flow chamber proximal end and the corresponding opening of said main valve for normal use of said fluid for braking service for said vehicle.

2. An improved anti-theft vehicle brake-supervising device as claimed in claim 1 wherein said valve support member has a cylindrical body with an opposite pair of closed and open ends respectively, said closed end thereof being connected to a push rod which is manually actuated through movement to correspondingly urge said member between said operative positions respectively adjacent said distal and proximal ends of said flow chamber, and said first valve is operatively disposed to extend from said open end of said member cylindrical body with said biasing spring in an interposed position between said first valve and said closed end of said member cylindrical body, whereby said biasing spring is adapted to compress to both allow for further movement of said support member relative to said first valve in said closed position thereof incident to said release of pressure and also to allow retracting movement of first valve within said cylindrical body incident to directional flow of fluid from said master cylinder to said one wheel cylinder.

3. An improved anti-theft vehicle brake-supervising device as claimed in claim 2 wherein said second valve and said pressure release valve opening cooperating therewith are formed in that side of said first valve in facing relation to said closed end of said valve support member, and said support member valve-unseating means includes an axial projection on said support member closed end effective to urge said second valve from said closed position over said pressure release valve opening incident to said movement of said support member towards said flow chamber distal end.

4. An improved anti-theft vehicle brake-supervising device as claimed in claim 3 wherein said main valve opening is of a conical shape, and said first valve is of a cooperating conical shape for achieving fluid-tight sealing contact therewith, said biasing spring being effective to allow for slight misregistration of said conical shapes to thereby facilitate the achieving of said fluid-tight sealing contact therebetween.

5. An improved anti-theft vehicle brake-supervising device as claimed in claim 4 wherein said first valve has a cylindrical body of a prescribed smaller diameter than that of said encircling valve support member so as to define a corresponding encircling annular fluid passage for allowing fluid flow from said flow chamber along said first valve to said pressure release valve opening formed therein.

6. An improved anti-theft vehicle brake-supervising device as claimed in claim 3 including a spring operatively disposed in biasing relation to said second valve, and means for regulating the extent of compression of said biasing spring for correspondingly regulating the extent of pressure necessary to unseat said second valve, whereby fluid is adapted to be selectively released for flow to said master cylinder in the event of thermal expansion thereof in said wheel cylinder without unseating of said first valve from said main valve opening.

* * * * *

UNITED STATES PATENT OFFICE
CERTIFICATE OF CORRECTION

Patent No. 4,018,314                    Dated April 19, 1977

Inventor(s) Raymond Richmond et al.

It is certified that error appears in the above-identified patent and that said Letters Patent are hereby corrected as shown below:

Column 7, line 63, after "selectively" insert --being--.

*Signed and Sealed this*

*fifth* Day of *July 1977*

[SEAL]

Attest:

RUTH C. MASON
*Attesting Officer*

C. MARSHALL DANN
*Commissioner of Patents and Trademarks*